Oct. 28, 1930.  S. M. FAIRCHILD  1,779,424

REWINDING AND RESETTING MECHANISM

Filed Nov. 25, 1927    2 Sheets-Sheet 1

Inventor
SHERMAN M. FAIRCHILD
Attorney
B H Carpenter

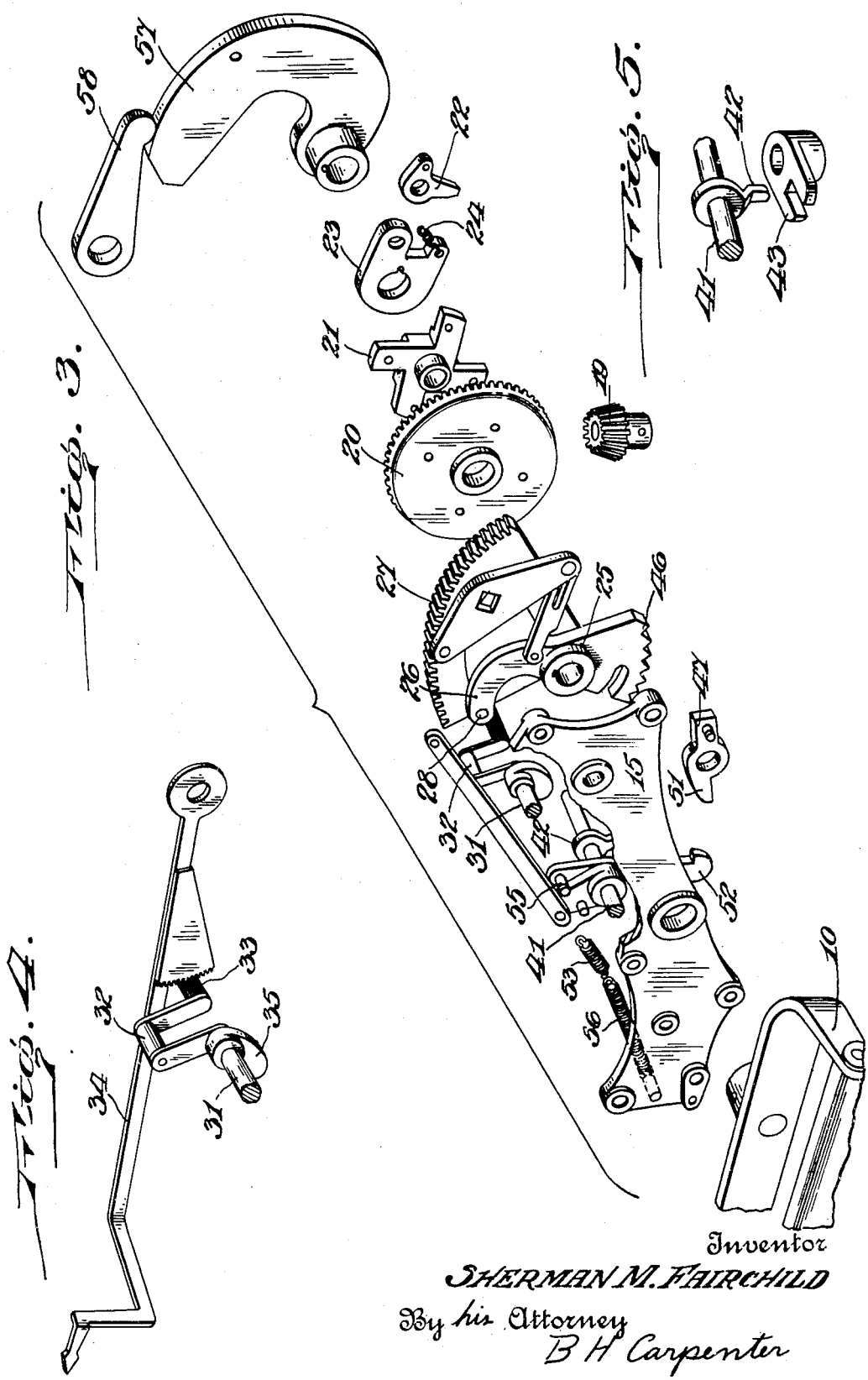

Patented Oct. 28, 1930

1,779,424

UNITED STATES PATENT OFFICE

SHERMAN MILLS FAIRCHILD, OF NEW YORK, N. Y.

REWINDING AND RESETTING MECHANISM

Application filed November 25, 1927. Serial No. 235,548.

This invention relates to cameras and especially aeronautical cameras of the hand held type.

In cameras of this type now prevalent in use, the operation of rewinding the shutter mechanism and feeding the film requires the operator to release at least one of the hand grips, grasp a winding handle and make several turns of the same. This procedure invariably results in the operator looking at the camera during these movements thus losing sight of the objective which he is photographing.

It is the object of this invenetion to provide in a hand held aerial camera mechanism whereby the shutter may be rewound and an unexposed sensitized surface advanced to exposure position by an operator without removing his hands from the hand grips or disturbing the alinement of the camera in regard to the object photographed. I attain this object by incorporating with the hand grips of the camera the shutter rewinding mechanism, and sensitized surface advancing mechanism. In the specific embodiment illustrated in the accompanying drawings, I have shown the shutter rewinding mechanism and sensitized surface advancing mechanism as both operated by one of the hand grips but I do not desire to limit myself in this respect.

Other improvements and objects of my invention will appear from the following description and drawings in which:—

Fig. 3 is a distended view showing the relationship of the driving and operating mechanism parts.

Fig. 4 is a detail of the film-metering control shaft and cam.

Fig. 5 is a detail of a part of the shutter tripping mechanism.

Figure 2:
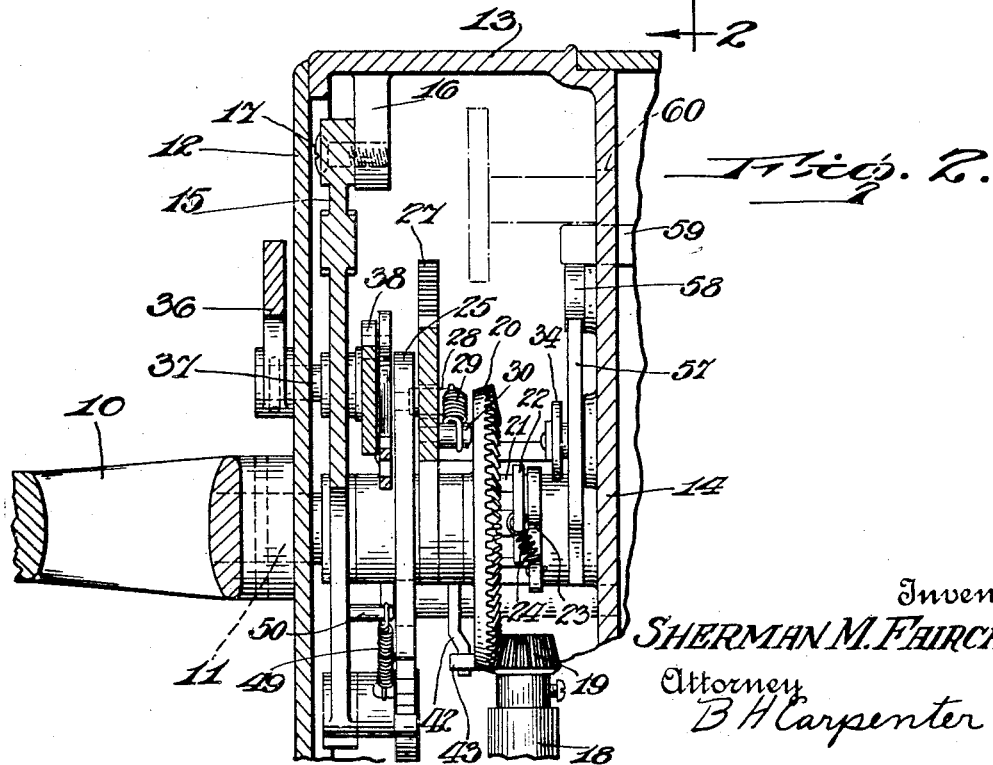
Fig. 2 is a sectional view thru the rewinding and advancing mechanism on a plane passing thru the line 2—2 of Figure 1.

Referring to the drawings, I have illustrated my invention in connection with a hand grip mounted on a camera magazine and have designated the hand grips by the numeral 10 in Fig. 2. This hand grip is secured in any suitable manner to a shaft 11 which extends thru the cover plate 12 of the camera magazine 13 and is mounted at its inner end in a suitable bearing in a cross partition 14 in the magazine. A bearing plate 15 is provided just within the cover plate 12 and is supported from the magazine 13 by brackets or lugs 16 to which it is attached by any suitable means as by screws 17. This bearing plate serves not only as a bearing support for the shaft 11 but also for various other parts of the mechanism as will hereinafter be described.

I will now describe the mechanism whereby the shutter is rewound. The shutter itself is not shown on the drawings. A rewinding shaft leading from the shutter is mounted at its upper end in a bearing 18 in the magazine casing 13 and a bezel pinion 19 is secured to the end of the shaft within the magazine casing. This pinion 19 meshes with a bevel gear 20 loosely mounted on the shaft 11.

A one way ratchet clutch mechanism is provided for driving the gear 20 from the shaft 11 and is constructed as follows. A ratchet member 21 is secured to the gear 20 and cooperates with a ratchet dog 22 mounted on a driving member 23 secured to the shaft 11. A spring 24 presses the dog 22 against the ratchet member 21. The ratchet member and the dog 22 are so arranged that a clockwise rotation of the shaft 11 as viewed in Fig. 1 will be transmitted to the gear 20 and therethru to the pinion 19 thus winding the shutter. The dog and ratchet member permit rotation of the shaft 11 in the reverse direction without moving the gear 20. In operation, the shaft 11 is oscillated by the hand grip 10 after each exposure thus rewinding the shutter for the next exposure. Fullstroke mechanism is associated with the shaft 11 for insuring a complete winding of the shutter and will be fully described hereinafter.

Figure 1:
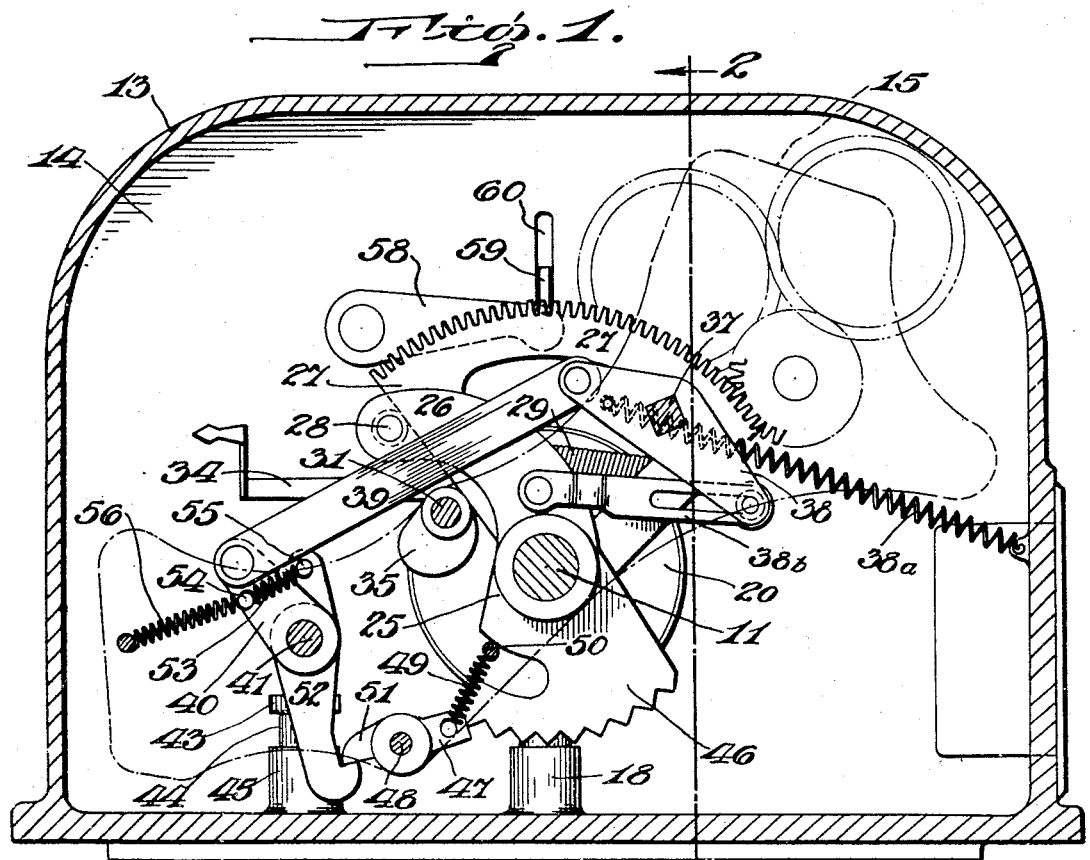
Fig. 1 is a sectional view showing the relation of the shutter rewinding mechanism parts and the sensitized surface advancing mechanism parts.

The mechanism whereby the sensitized surface is advanced will now be described. To this end a driving member 25 is secured to the shaft 11 and is provided with an upwardly extending and counter-clockwise curved arm 26 as shown in Figs. 1 and 3. A gear sector 27 is mounted loosely on the shaft 11 closely adjacent the inner face of the member 25, as shown in Figs. 2 and 3. A rearwardly projecting stud 28 is mounted near the outer end of the arm 26 of the driving member 25. This stud projects across the path of movement of the sector 27.

The sector 27 is biased toward the stud 28 by a spring 29 secured at one end of the stud 28 and at the other to a stud 30 projecting from the said sector. As shown in the drawings, the sector occupies a position closely adjacent the stud 28 and in the clockwise travel thereof as viewed in Fig. 1. The stud 28 positively drives the sector 27 in a clockwise direction upon a clockwise movement of the shaft 11 as viewed in Fig. 1. The spring 29 causes the sector 27 to follow the return movement of the stud 28. The purpose of the spring connection between the sector 27 and the stud 28 is to provide for the operation of a film metering mechanism which will be described hereinafter.

The drive from the sector 27 to the film spool is accomplished thru a train of gearing including a one way ratchet. This gear train will not be described in detail other than to state that the one way ratchet is so positioned as to transmit motion upon the clockwise rotation of the sector 27 as viewed in Fig. 1 and to permit the free return thereof. A fullstroke mechanism hereinbefore mentioned is associated with the shaft 11 requiring a sufficient oscillation thereof to advance a new sensitized surface to exposure position at each oscillation of the shaft 11. This mechanism will be described immediately.

The film metering or measuring device which I employ in this invention is constructed as follows. A cross shaft 31 is mounted in suitable bearings in the bearing plate 15 and the partition 14 and extends in close proximity to the left hand edge of the sector 27 as viewed in Fig. 1. This shaft is provided with an offset portion 32 to allow clearance for the gear 20 and with a toothed portion 33 cooperating with a segment on an indicating pointer 34 and positioning said pointer 34 in accordance with the rotation of the shaft 31. A suitable scale may be provided cooperating with the indicating pointer. The shaft 31 is rotated, that is, positioned, in accordance with the amount of film on the film storage spool by means of a lever connected to said shaft and biased against said film on said spool. The lever is not shown in the drawings but is similar to that used in the well-known Fairchild cameras. A cam 35 is fixed to the shaft 31 in line with the sector 27. The return of the sector 27 is blocked by the cam 35 thus controlling the effective winding stroke of the sector and therefore the amount of film wound at each operation. The cam is so proportioned as to cause equal length of film to be wound at each operation of the hand grip.

The mechanism for tripping the camera shutter includes a trigger 36 conveniently located adjacent the hand grip 10 and secured to a shaft 37 mounted in the bearing plate 15 and extending some distance inside said plate. On the inner end of the shaft 37, a two-armed rock member 38 is secured. The arms of the rock member 38 extend in substantially opposite directions and one of said arms is connected by a link 39, Fig. 1 to an arm 40 fixed to a shaft 41 extending between and mounted in the bearing plate 15 and the partition 14. To this shaft 41 is also fixed a downwardly projecting lug 42 extending between the forks of a forked member 43 fixed to the shutter tripping shaft 44 extending within the camera magazine and mounted in bearing 45 as shown in Fig. 1.

A spring 38$^a$ is connected at one end to the arm of rock member 38 to which the link 39 is pivoted and at the other end to a point in the magazine casing such that the spring extends across the line of the shaft 37. The spring is so positioned that when the trigger is in set position, the spring extends slightly below the centerline of shaft 37 thus holding the trigger in set position against unintentional operation. However, when the trigger is depressed slightly, the rock member 38 is moved clockwise in Fig. 1, carrying the spring to the other side of the center line of the shaft 37. The spring now snaps the trigger and the mechanism operated thereby to fully operated position. The trigger mechanism is reset by link 38$^b$ pivotally attached at one end to the driving member 25 and connected to the lower arm of the rock member 38 by a pin and slot connection, as shown in Figure 1.

The fullstroke mechanism includes a downwardly projecting sector 46 forming a part of the driving member 25. This sector 46 is provided with saw-teeth on its periphery which cooperate with a fullstroke wipe pawl 47 pivoted on a stud 48 projecting from the bearing plate 15. A spring 49 is provided for biasing the pawl 47 against the sector 46. This spring is secured at one end to the pawl and at the other to a stud 50 projecting from the bearing plate 15. The sector 46 is cut away, as shown in Fig. 1, to provide suitable operating clearance without interference with the stud 50. Fullstroke mechanisms are too well-known to require a further explanation here.

In order to prevent a winding operation without an exposure an interlock is provided between the fullstroke pawl 47 and the shutter tripping mechanism. In this interlock is included a rearwardly projecting lug 51 formed on the pawl 47, as shown in Fig. 1 and cooperating with a hook member 52 loosely mounted on the shaft 41 adjacent the arm 40. The hook member 52 is connected to the arm 40 by a spring 53 extending from a stud 54 on the arm 40 to a stud 55 in the arm 52. The stud 55 extends across the path of movement of the arm 40 and permits a positive movement of the hook 52 by the arm 40 of the shutter tripping mechanism. A spring 56 is attached at one end to the stud 54 on the arm 40 and at the other end to a stud on the bearing plate 15. This spring 56 serves to bias and return the shutter tripping mechanism to home position. When the shutter tripping mechanism is in home position the hook member 52 lies in position to engage the lug on the pawl 47 and prevents the same from rotating under action of the spring 49. The pawl 47 is thus held as shown in Fig. 1 abutting the outer face of the last tooth on the sector 46 thus preventing clockwise movement of the shaft 11 thereby preventing advancing of the sensitized surface and winding of the shutter. In the tripping of the shutter the arm 40 moves the hook 52 out of engagement with the lug 51 on the pawl 47 thus permitting the pawl to pivot counterclockwise as viewed in Fig. 1, about the stud 48 to a position wherein the sector 46 is released and the shaft 11 is free to turn clockwise to rewind the shutter and advance the sensitized surface.

The shaft 11 not only drives the shutter winding and sensitizing surface advancing mechanism but also operates the pressure plate (not shown in the drawing) which holds the sensitized surface flat during exposure. To this end a cam arm 57 is secured to the shaft 11 adjacent the magazine partition wall 14. This cam cooperates with a rock member 58 pivoted on the partition 14. The rock member in turn cooperates with a lever 59 of any conventional pressure plate mechanism projecting thru slot 60 in the partition wall 14. When the shaft is in home position the cam 57 raises the rock member 58 and therethru the lever 59 forcing the pressure plate against the sensitized surface thus holding the same flat. When the shaft 11 is rotated to advance the sensitized surface the cam 57 immediately moves away from the rock member 58 thus permitting the descent of the lever 59 thus permitting the sensitized surface to be advanced unhampered by the pressure plate.

Various changes in the construction of the embodiment illustrated in the drawings may be made without departing from the spirit of the invention and I do not therefore desire to limit myself to the specific construction shown and described, but to interpret the invention broadly within the scope of the appended claims.

What I claim as my invention is:

1. In a device of the class described, a shutter rewinding mechanism, a sensitized surface advancing mechanism, a pressure plate mechanism, and a common manually operable means for positively operating each of said mechanisms and also serving as a hand grip for supporting said camera.

2. In an aerial camera having a supporting handgrip, a shutter rewinding mechanism operated by said handgrip, a shutter tripping mechanism, and an interlock between said rewinding mechanism and said tripping mechanism for preventing movement of said handgrip until operation of said tripping mechanism.

3. In an aerial camera having a movable supporting handgrip, a shutter rewinding mechanism driven by movement of said handgrip, a shutter tripping mechanism, and a locking device controlled by said tripping mechanism for preventing movement of said handgrip.

4. In an aerial camera having a sensitized surface advancing mechanism, a pressure plate mechanism, and a common manually operable means for positively operating each of said mechanisms and also serving as a hand grip for supporting said camera.

5. In an aerial camera having a movable handgrip, a sensitized surface advancing mechanism including a gear sector, a member operatively connected to said handgrip for movement thereby and a spring connecting said gear sector to said member.

6. In an aerial camera having a rotatable handgrip for supporting said camera and operating sensitized surface advancing mechanism, a sensitized surface advancing mechanism including a gear sector a member operatively connected to said handgrip for movement thereby and formed with a projection adapted to engage and move said gear sector to advance the sensitized surface upon movement of the handgrip in one direction, and a spring connecting said sector and member for biasing said sector toward said projection to return said sector upon return movement of the handgrip.

7. In an aerial camera having a rotatable handgrip for supporting said camera and operating sensitized surface advancing mechanism, a sensitized surface advancing mechanism including a gear sector a member operatively connected to said handgrip for movement thereby and formed with a projection adapted to engage and move said gear sector to advance the sensitized surface upon movement of the handgrip in one direction, a spring connecting said sector and member for biasing said sector toward said projection to return said sector upon return movement of the handgrip and a cam controlled by the sensitized surface for limiting the return movement of said sector.

8. In a device of the class described, a shutter rewinding mechanism, a sensitized surface advancing mechanism, a pressure plate mechanism, and a common manually operable means for positively operating each of said mechanisms and also serving as a handgrip for supporting said camera, and an interlock between said rewinding mechanism and said tripping mechanism for preventing movement of said handgrip until operation of said tripping mechanism.

In testimony whereof I affix my signature.

SHERMAN MILLS FAIRCHILD.